United States Patent [19]

Karwowski

[11] Patent Number: 4,664,931
[45] Date of Patent: * May 12, 1987

[54] METHOD OF PREPARING INSTANT, FLAKED, WHEAT FARINA

[75] Inventor: Jan Karwowski, Franklin Lakes, N.J.

[73] Assignee: Nabisco Brands, Inc., Parsippany, N.J.

[ * ] Notice: The portion of the term of this patent subsequent to May 20, 2003 has been disclaimed.

[21] Appl. No.: 811,332

[22] Filed: Dec. 20, 1985

Related U.S. Application Data

[63] Continuation of Ser. No. 661,383, Oct. 16, 1984, Pat. No. 4,590,088.

[51] Int. Cl.$^4$ ............................................. A23L 1/164
[52] U.S. Cl. ..................................... 426/621; 426/457
[58] Field of Search ............... 426/621, 620, 457, 619, 426/72, 74

[56] References Cited

U.S. PATENT DOCUMENTS

| | | | |
|---|---|---|---|
| 904,047 | 1/1908 | Coltrin | 426/621 |
| 1,163,175 | 12/1915 | Rullman | 426/575 |
| 1,388,873 | 8/1921 | McKay | 426/621 |
| 1,933,158 | 10/1933 | Bohn et al. | 426/621 |
| 1,990,329 | 2/1935 | Johnson et al. | 426/620 |
| 2,278,465 | 9/1938 | Musher | 99/83 |
| 2,890,118 | 6/1959 | Cantor et al. | 99/83 |
| 2,999,018 | 9/1961 | Huffman et al. | 99/83 |
| 3,526,512 | 9/1970 | Collins et al. | 99/83 |
| 3,526,513 | 9/1970 | Hyldon | 99/83 |
| 3,526,514 | 9/1970 | Gralak et al. | 99/83 |
| 3,664,846 | 5/1972 | Hyldon | 99/83 |
| 3,664,847 | 5/1972 | Hyldon | 99/83 |
| 3,787,584 | 1/1974 | Hyldon | 426/208 |
| 3,974,295 | 8/1976 | Gralak | 426/72 |
| 3,992,556 | 11/1976 | Kovacs et al. | 426/621 |
| 4,006,254 | 2/1977 | Gralek | 426/72 |
| 4,006,255 | 2/1977 | Gralak | 426/72 |
| 4,133,899 | 1/1979 | Wolffing et al. | 426/507 |

FOREIGN PATENT DOCUMENTS 1121381 3/1968 United Kingdom .

OTHER PUBLICATIONS

Matz, Samuel A., "Cereal Technology", AVI Publishing Co., Inc., (1970), pp. 226-231.

Primary Examiner—George Yeung
Attorney, Agent, or Firm—Richard Kornutik

[57] ABSTRACT

Process of preparing a dry, instant, wheat farina-like product in flake form which will readily rehydrate upon the addition of hot water. Farina is impregnated with a sufficient amount of water to saturate the farina. The wetted farina is tempered, preferably with agitation, to produce a material having uniform moisture. The tempered material is cooked, the average particle size of the cooked material being increased thereby. The average particle size of the cooked material is then reduced. The particulate material is flaked to form a dry product in flake form. The flaked material is dried. The dried, flaked material is capable of being readily rehydrated by the addition thereto of hot water to provide a food product having the texture, etc., of cooked farina.

3 Claims, 1 Drawing Figure

THE FIGURE
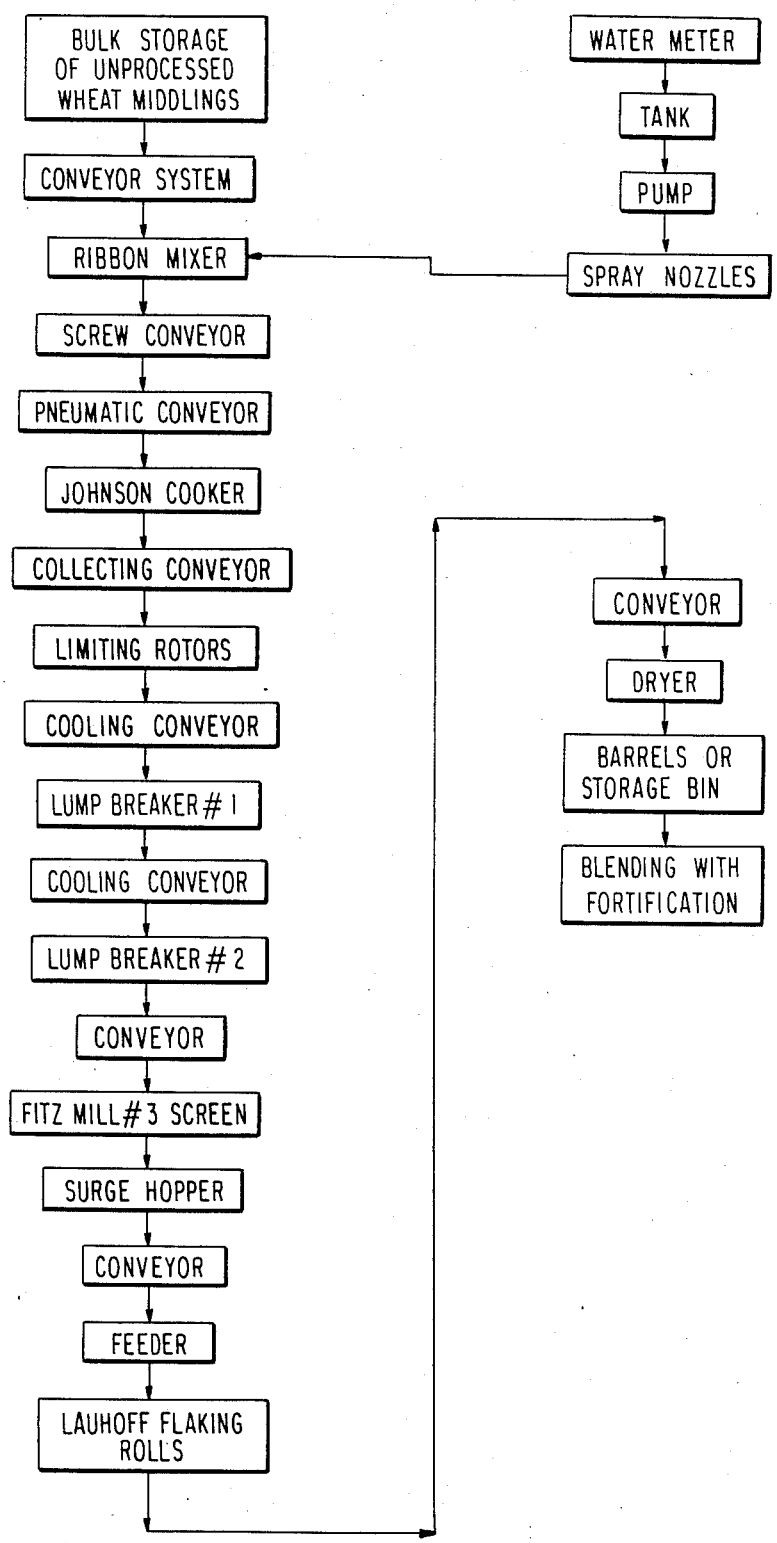

METHOD OF PREPARING INSTANT, FLAKED, WHEAT FARINA

This is a continuation of application Ser. No. 661,383, filed on Oct. 16, 1984, now U.S. Pat. No. 4,590,088.

BACKGROUND OF THE INVENTION

1. Field of the Invention

The invention relates to processes of preparing instant wheat cereals. The invention also relates to instant or ready-to-eat wheat cereals.

2. Prior Art

Ready-to-eat cereals are available in a variety of forms and are normally consumed with milk and sometimes sugar. Flaked varieties are very popular. During processing the starch is gelatinized, halting enzymic reactions and thus providing product stability and good shelf life.

Matz, Samuel A., "Cereal Technology", The Avi Publishing Company, Inc., (1970), pages 229 to 231, teaches a process for the manufacture of cold-eating wheat flakes from kernels of wheat. After cleaning and classifying according to size, the wheat is tempered with added moisture in steel bins of small diameter at approximately 80° F. for 24 hrs. The wheat can be transferred one or more times during this period if such a procedure is necessary in order to keep the temperature within reasonable limits. After tempering, the wheat is steamed at atmospheric pressure until it reaches about 203° F. and 21 percent moisture. The steamed wheat is "bumped" between smooth steel rollers set considerably farther apart than are flaking rolls. Such treatment flattens the grain slightly and ruptures the bran coat in several places making the kernel more permeable to the moisture added during the cooking step. The flattened kernels are transferred to the pressure cookers, which are similar to those used for corn flakes, and the other ingredients are added. Such other ingredients include sugars, salt, malt, and sometimes a coloring substance such as caramel.

The Matz process continues with the retort contents being cooked at 20 psi steam pressure for 90 minutes while the vessel rotates slowly. After cooking, the grains are soft, translucent and brown and they contain about 45 to 50 percent moisture. The starch has, of course, been completely gelatinized. Rotation of the opened retort dumps the contents onto a moving belt which transfers the cooked mass to a chute leading to a "Wiggler." The Wiggler consists of a horizontal perforated disc, through which warm air is blown in an upward direction, and a rotating arm carrying vertically-oriented inflexible fingers around its upper surface. The clumps of slightly adherent grain are dropped onto the center of the perforated disc and are broken up and the individual grains moved to the outer edge of the disc by the moving fingers. The individual grains fall from the edge of the disc and are transferred pneumatically to a horizontal rotating cylinder fitted with internal louvers. In this drier, air at 250° to 300° F. is passed over the grain, reducing it to 28 to 31 percent moisture. Holding bins are used to store the material until it can be transferred to the presses. At this point, the grains are still intact and are rather tough and chewy in texture. Subsequent processing is designed to secure the required crispness. First, the wheat pieces travel through a drier. This can be a Proctor and Schwarz drier composed of 3 sections, the first at 280° F., the second at 290° F. and the third unheated. Rate of movement of the material is adjusted to yield a product containing about 21 percent moisture. A spray of B-complex vitamins is applied at this stage.

Screw conveyors or drag chain conveyors, in the Matz process, transport the partially dried pellets to the flaking rolls. Just before falling into the flaking rolls, the pellets are heated to about 180° to 190° F. and they become plasticized. The large steel flaking rolls are practically identical with those used for making corn flakes. The pressure applied to the pellets increases their diameter several times and decreases their thickness proportionately. When they leave the rolls, the flakes contain 10 to 15 percent moisture and are still slightly flexible. To obtain the desired crispness, they are toasted and dehydrated to less than 3 percent moisture content in a drier with a perforated travelling metal belt. Temperature in the oven may be divided into 4 regions; for example, heated sections at 310°, 300° and 280° F., and an unheated section to partially cool the product. The decreasing temperature is said to promote the development of the desirable curling and blistering.

Matz, Samuel A., ibid., pages 226 to 229, teaches a method of producing corn flakes. Corn is milled to produce large pieces free of germ and bran. The corn grits are placed in a cylindrical pressure cooker along with flavoring syrup consisting of sugar, malt (nondiastatic), salt and water. During the cooking period the charge accumulates additional water from the steam introduced into the retort, rising to about 33 percent moisture. Cooking is done in the slowly rotating retort at 15 to 23 psi steam pressure for 1 to 2 hours. After cooking, the pressure is reduced to the atmospheric level, the retort is opened and the contents are dumped out onto a moving belt. After the lumps from the cooker are broken down to individual particles by a revolving reel, they are dried. The dried particles contain 19 to 23 percent moisture, but this water is unevenly distributed, so the material is transferred to tempering bins for several hours (as many as 24) so that the moisture can equilibrate. After tempering, the hard, dark brown grits are ready for flaking. The flaking rolls are steel cylinders cooled by internal circulation of water. The cooked dried grits are pressed into thin flakes as they pass through the rolls. The product is still rather flexible at this time, lacking the desired crispness and the preferred flavor of the finished corn flake. From the rolls, the flakes pass directly to the rotating toasting ovens, which are usually gas fired. In addition to being thoroughly dehydrated by the process, the flakes are toasted and blistered. They emerge from the oven with less than 3 percent moisture. The corn flakes are then cooled in expansion bins.

BROAD DESCRIPTION OF THE INVENTION

An object of the invention is to provide a process for preparing an instant, flaked, wheat farina-like product which can be rehydrated by the mere addition thereto of hot water. Another object of the invention is to provide an instant, dry, flaked, wheat farina-like product which has excellent flavor and texture characteristics and can be rehydrated by merely adding hot water thereto. Other objects and advantages of the invention are set out herein or are obvious herefrom to one ordinarily skilled in the art.

The objects and advantages of the invention are achieved by the processes and products of the invention.

The invention involves a process for preparing a dry, instant, wheat farina or farina-like product in flake form which will readily rehydrate with hot water. The invention does not produce a cold eating product—instead the invention produces a product that needs reconstituting with hot water. The process includes impregnating or admixing wheat farina or farina-type material with a sufficient amount of water to saturate the material, that is, 15 to 20 weight percent of water is used, based on the total dry weight of the wheat farina or farina-like material. Any wheat particles can be used which are in a reduced size state, although farina size is preferred. The water-impregnated material is tempered to produce a tempered material at uniform moisture. The cooked product has a water content of 15 to 20 weight percent. The tempered material is sufficiently cooked to gel the starch present in the farina. The cooking increases the average particle size of the material, when compared to uncooked product. The average particle size of the cooked material is then reduced. The cooked, particulate material is flaked at a temperature of less than 120° F. to form a material in flake form. The flaking could be termed high water-content flaking due to the high water content of the material being flaked. The cooked, particulate material to be flaked and the material in flake form after flaking each has a water content of 15 to 18 weight percent—the material has insignificant water loss during flaking. The flaked material is dried to provide a dry product in flaked form. The flaked product of the invention is not toasted. The dry, flake product is capable of being readily rehydrated or reconstituted by the addition thereto of hot water or a hot liquid containing water. The dry, flaked, instant, wheat farina or farina-like product upon rehydration has the flavor and texture characteristics and physical appearance of cooked farina. The rehydrated flake product is appetizing and readily digestible, and is creamy and smooth. No guar gum or alginate, such as, Keltrol F, is added or used during the invention process of preparing dry, flaked, instant, wheat farina or farina-like product of the invention. However, optionally gums, such as, arabic gum, can be used in the final formulation (after flaking) of the invention flaked product. Such optional gums help hold the product together and help increase the viscosity in the rehydrated product.

Copending, common-inventorship, commonly-assigned U.S. application Ser. No. 531,983 (filed on Sept. 14, 1983), involves a process of preparing a dry, instant, wheat farina or farina-like product in flake form. The flaking in such a process is done using particles having a moisture content of 12 to 14 weight percent. The flaking in the invention is done at a higher moisture content which provides a flake which in final dry form will rehydrate quicker and, once rehydrated, is creamier and softer. This occurs because flaking in the invention process does not mechanically destroy the structure of the starch cells in the wheat particles. The invention flakes are more flexible and fatter than the flakes produced by the process of U.S. application Ser. No. 531,983. The pertinent portions of U.S. application Ser. No. 531,983 are incorporated herein by reference. The process of such application involves: admixing guar gum powder and wheat farina or farina-like material; admixing water with such admixture; tempering the water-impregnated admixture; cooking the tempered admixture; reducing the particle size of the cooked material; drying the cooked material to a water content to a water content of 14 or less percent; tempering the dried material; and then flaking the dried material.

The dry, instant, flaked, wheat farina or farina-like product of the invention can be mixed with an instant oat product to provide an oat/wheat instant cereal product.

As used herein the terms "instant" and "ready-to-eat" mean a product that does not require a cooking step by the consumer, i.e., a product that can be prepared for use simply by adding hot water or hot milk to it and mixing it in a cereal bowl.

In the following disclosure, the letters in parenthesis refer to the steps of Claim 1 below or the materials in such steps.

The wheat farina or farina-type material is preferably impregnated with water by spraying the wheat farina or farina-type material with the water. The wheat farina or farina-type material is impregnated with 15 to 20 weight percent, preferably about 18 weight percent, of water based on the total dry weight of the wheat farina or farina-type material.

Water-impregnated material (a) is tempered preferably at a temperature of 32° to 40° C. for about 15 to 20 minutes but not more than one hour. A moisture content of 15 to 20 percent by weight, preferably about 18 percent by weight, based on the total dry weight of the wheat farina or farina-type material, is achieved during the tempering. Preferably, the tempering is achieved with agitation, which keeps the material free-flowing. The purpose of the tempering is to achieve or assure a uniform moisture content throughout the particles of water-impregnated material (a). The tempering shortens the time needed in the subsequent cooking step.

Tempered material (b) is cooked sufficiently to gel the starch present in the farina. Tempered material (b) is cooked preferably at temperature of 110° to 120° C., at a pressure of 10 to 15 p.s.i. and for 10 to 30 minutes. The cooking is done in a steam cooker. Tempered material (b) is most preferably cooked at a temperature of about 120° C., at a pressure of about 15 p.s.i, and for about 12 minutes. The cooking increases the average particle size of tempered material (b) preferably the increase in the average particle size is from number 12 to number 40 mesh (U.S. Standard). The particle size reduction step eliminates the big lumps. Preferably, the average particle size of cooked material (c) is reduced by means of grinding. Preferably, the average particle of size of cooked material (c) is reduced to less than 0.5 inch. Cooked, particulate material (d), that is to be flaked, has a moisture content of 15 to 20 percent by weight, preferably about 18 percent by weight, based on the total dry weight of the wheat farina-type material.

The wet flakes, before drying are flexible and preferably have a thickness of about 0.015 inch.

The flakes of the product preferably have an average thickness of 0.010 to 0.020 inch. The flaking is achieved such that the temperature of the material to be flaked during flaking does not exceed 120° F. The flaked material has a moisture content of 15 to 20 weight percent, preferably 18 weight percent, based on the dry total weight of the wheat farina or farina-like product.

Particulate material (e) is preferably dried at a temperature of 70° to 85° C. for 5 to 10 minutes. Also, preferably particulate material (e) is dried sufficiently to reduce the water content of particulate material (e) from 18 to about 12 weight percent or less, based on the total dry weight of the wheat farina or farina-type material. For storage purposes, preferably the dry, flaked product is placed in sealed containers. The liquid used to reconstitute the dry, flaked product preferably is hot water or hot milk. Essentially no lumps are formed upon reconstitution or rehydration of the dry, flaked product.

Preferably about 6 to 30 weight percent, based on the total weight of dry, flaked, particulate material (f), of at least one fortifying agent is added to dry, flaked, particulate material (f).

The instant wheat flakes of the invention can be admixed with instant oats to obtain an oats-wheat instant cereal product. Any ratio of instant oats to instant wheat flakes can be used, with the ratio normally ranging from 90:10 to 10:90.

The invention includes the dry, instant, wheat farina or farina-like product in flake form prepared by the processes of the invention. The instant flake product of the invention is not a toasted product. The instant product has excellent flavor and texture characteristics with good stability and shelf life. The instant product has mouth feel, flavor, consistency and other organoleptic properties similar to those normally possessed by conventional "hot" farina cereals requiring extended cooking while having the advantage of quick and convenient preparation by the consumer. The invention product is fatter and more flexible, and rehydrates quicker than other instant wheat flaked products. The invention product avoids the prior art problems of scorching, lumping, sticking to the pan, etc. The invention wheat product can be taken from its sealed package, placed in a bowl, hot water or hot milk added, stirred lightly, sugar, cream and fruit added, if desired, and then consumed. The rehydrated invention product is creamier, smoother and softer than other rehydrated, instant, wheat, flaked cereals.

The dry, instant, flaked, wheat product of the invention can be mixed with an instant oats product to produce an oats-wheat instant cereal product.

BRIEF DESCRIPTION OF THE DRAWING

In the drawing:

The FIGURE is a schematic diagram illustrating the steps of a preferred embodiment of the invention process.

DETAILED DESCRIPTION OF THE INVENTION

As used herein, all parts, percentages, ratios and proportions are on a weight basis unless otherwise stated herein or otherwise obvious herefrom to one ordinarily skilled in the art.

The invention product is a ready-to-eat or instant cereal prepared from at least one wheat farina or farina-like product, such as, wheat middlings. The wheat used must have been subdivided into any reduced-size state, but preferably into the farina state. The farina used usually has an average particle size between about 20 and 40 mesh (U.S. Standard). The Federal Specification for farina requires that: 100 percent of the product pass through a U.S. Standard No. 20 woven-wire-cloth sieve; not more than 10.0 percent pass through a U.S. Standard No. 45 sieve; and not more than 3.0 percent pass through a U.S. Standard No. 100 sieve.

Flour by-products, derived from the outer coverings of the wheat grain separated in extraction of the flour from the grain, are bran and the finer, more floury outer coverings are termed middlings. The middlings produced in flour milling, essentially small pieces of endosperm free from bran and germ, are termed farina. The composition of middlings can vary a great deal depending on the wheat used and the amount of endosperm present. In the manufacture of farina, it is necessary to use hard wheat as a raw material since soft wheat yields a product which becomes excessively pasty upon cooking. A typical wheat coarse middlings contains 19.0 percent of protein, 5.8 percent of fat, 65.0 percent of carbohydrates, 6.0 percent of fiber and 4.20 percent of ash. A typical wheat fine middlings contains 18.0 percent of protein, 3.9 percent of fat, 73.1 percent of carbohydrates, 2.2 percent of fiber and 2.8 percent of ash.

The dry wheat farina or farina-like material, at this stage in the process, can also be mixed with additional ingredients, such as vitamins, minerals, flavoring and antioxidants. Such additional ingredients should not usually be present in an amount greater than 40 weight percent, based on the total dry weight of the dry wheat farina or farina-like material. Vitamins, if added during the invention process, are preferably added to a dry composition. Usually salt (NaCl) in the amount of about 0.5 to 4.0 percent by weight is added, although some of the NaCl can be replaced with KCl.

The dry wheat farina or farina-like material is impregnated with water in an amount of about 15 to 20 percent, preferably about 18 weight percent, based on the total weight of the dry wheat farina or farina-like material. It is best to completely saturate the wheat farina or farina-like material even to the extent of visible excess water being present in the wetted material. The wheat farina-like material should not be wetted to such an extent that it becomes a dispersion-solution. The farina or farina-like material is preferably impregnated with water by spraying the water onto the material, although any other suitable water impregnation technique can be used.

The water-impregnation material is then tempered using any suitable tempering technique and equipment. For example, the tempering and agitation can be done in a ribbon blender or a mixer. The tempering is usually done at a temperature of 30° to 40° C. for 5 to 60 minutes and preferably at a temperature of 32° C. for about 15 to 30 minutes. The tempering can be done at, below or above atmospheric pressure. The tempering reduces the time required for the subsequent cooking step. The temperature and time of the tempering step does not allow setting or substantial gelatinizing of the starch present in the admixture components.

The tempered material is then cooked at a temperature of 110° to 120° C., at a pressure of 10 to 15 p.s.i. and for 10 to 30 minutes. The cooking is preferably done at 15 p.s.i. for about 12 minutes. The cooking can be done using any suitable steam, pressure cooker. The cooking step means a heat treatment which causes a loss of bite-fringence but is not so severe as to produce transparency of the farina particles. The cooking step is preferably accomplished using a rotating drum which is internally heated or using a simple retort. Exposure therein must be of sufficient temperature-time contact so as to completely cook the product. The cooking should completely gelatinize the starch present in the composition. The cooked material is composed of particles which have increased to an average particle size of 12 to 60 mesh or larger (U.S. Standard).

The particle size reduction step eliminates lumps and large agglomerates. The preferred particle size reduction technique is grinding, although the particle reduction can be done using any suitable particle size reduction technique and equipment. Preferably the product is passed through a grinder with an inserted screen designed for the reduction of the size of the particles of cooked material.

The tempered, cooked material can be flaked using any suitable flaking equipment and method. Flaking is basically a process or step of flattening the tempered, cooked wheat particles between rollers. For example, the tempered, cooked wheat material can be flaked by passing it between large steel cylinders (180 to 200 revolutions per minute, or higher), with the rolls cooled by internal water circulation (to avoid sticking at the high water content of the material to be flaked in the invention.) Typically, screw conveyors or drag chain conveyors transport the tempered, cooked wheat material composition to the flaking rolls. Just before falling into the large steel flaking rolls, the cooked, dried wheat material is tempered at about 90° to 100° F., and the wheat particles become plasticized. The temperature of the wheat particles during the flaking step is not allowed to rise above 120° F. The pressure applied to the wheat material increases their diameter several times and decreases their thickness proportionately. When the flaked wheat particles leave the rolls, the flakes contain about 15 to about 20 percent, preferably about 18 percent, of moisture and are still flexible. The wet flakes, before drying, are flexible and preferably have a thickness of about 0.015 inch.

Flaking, as used herein, is basically the flattening of the soft, cooked, wheat particles having a moisture content of 15 to 20 percent by weight, between rollers. The cooking has gelatinized the starch in the wheat particles before the flaking step. The dry instant flakes of the invention have good consumer appeal to their crisp but friable texture, their sweet but rather bland flavor, and to the ease with which a portion thereof can be readied for consumption.

The material is then dried or partially dried to a moisture content of 12 to 14 weight percent, preferably about 13 weight percent, based on the total dry weight of the farina or farina-like material. The drying can be done using any suitable drying technique and equipment.

After drying the flaked material, fortifying and other additives, flavoring, colorant, salt, sugars, minerals, wheat germ, cocoa, antioxidants and the like can be incorporated into the dried flaked wheat middlings. The additives include B-complex vitamins, malt, soluble iron compounds, vitamin A, vicamin C, BHA and BHT. Also, non-fat dry milk solids, (i.e., milk powder) or soybean protein may be added in an amount sufficient to create a final protein level of up to 10 to 20 percent.

Further, after drying the flaked material, about 5 to 8 percent of at least one fruit can be incorporated into the dried, flaked wheat material. The more popular dry fruits that can be used in the invention process include apple, apricot, blackberry, boysenberry, cherry, currant, plum, elderberry, fig, gooseberry, grape, guava, loganberry, nectarine, peach, pear, pineapple, quince, rasberry, strawberry and other fruits or flavors. The flaked product of the invention is not subjected to a toasting or roasting step. Also, an emulsifier does not have to be used in the process or product of the invention.

Guar gum or alginates are not required or used in the processes or compositions of the invention. The use of guar gum in known dry, instant, farina products (cereals) was known to cause a lumping problem in the cereals upon rehydration or reconstitution. U.S. application Ser. No. 531,983 uses guar gum to achieve several advantages and does not have a lumping problem. The invention product, which does not use guar gum or alginates, achieves those advantages plus others and does not incur lumpiness upon rehydration. However, optionally gums, such as arabic gum, and other gums can be used in the final formation (after flaking) of the invention flaked product. Such optional gums help hold the product together and help increase the viscosity in the rehydrated product.

The dried, flaked product usually has a moisture content of 12 to 14 weight percent. The dried, flaked product is quite stable and can be stored in a sealed container for at least 12 months. It is believed that during preparation of the dried, flaked product the starch is gelatinized, which halts enzymatic activity and provides good stability and shelf life for the dried, flaked product.

The dried, flaked product can be made ready-to-eat by reconstituting in a bowl with hot water, milk or other suitable edible liquid containing water. Usually hot milk or hot water is used for reconstitution. Sugar or other sweeteners, for example, can be added. The dried, flaked product is in a ready-to-eat or instant form and is truly an "instant" wheat farina-like product which can be prepared in a bowl by the consumer without a cooking step. The dried, flaked wheat product has excellent flavor and texture characteristics.

While not necessary, the ready-to-eat product can be reconstituted by cooking (boiling) for a minute or so. It is not necessary to have added disodium phosphate (e.g., 0.25 weight percent), although it can be used, to reduce the cooking time since reconstitution by cooking is only an option with the invention product.

The process of the invention can also be used to prepare instant, dried, flaked, ready-to-eat cereal products from other than wheat farina. For example, cereal grains such as rice, barley, oats, rye, corn, millet, etc., can be used in the invention process in place of the wheat farina, or at least part thereof. Such cereal grains should be used in a particulate form which has a particle size within the approximate particle size range of wheat farina.

In one embodiment of the invention, the instant wheat flakes of the invention are admixed with instant oats to provide a oats-wheat instant cereal product. The instant oats can be obtained from commercial sources or by means of any suitable production process. The criterion for an "instant" oat product is that it can be added to hot water or hot milk and dissolved or suspended uniformly with a minimum of agitation, such as, by stirring with a spoon.

EXAMPLE 1

Dry wheat middlings was sprayed with 18 weight percent of water. The wetted wheat middlings was tempered with agitation for 25 minutes at a temperature of 35° C. The tempered material was cooked in a pressure cooker for about 12 minutes at 15 p.s.i. The size of the particles was increased to about 12 mesh during cooking. The average particle size (lumps and agglomerates included) was reduced to about 0.125 inch by means of grinding. The cooked, tempered wheat particles were flaked using large steel flaking rolls. The flaked particles had a uniform moisture content of 18 weight percent. The flaked product was then dried in a dryer to a moisture content of 13 weight percent. 6.55 pounds of a fortification mixture containing wheat germ, sugar, calcium carbonate, reduced iron partially hydrogenated soybean oil, niacin, BHA, vitamin A acetate, pyridoxine hydrochloride, thiamine monoitrate (vitamin B), riboflavin (vitamin B$_2$) and folic acid, were then thoroughly admixed with 100 pounds of the dried composition in a blender to produce the finished product. The blended product was conveyed by a conveyor to the packaging machine where it was packed in individual serving portions at 1 oz. per packet. 10 packets were packed per carton. The dried, flaked and mixed composition was readily reconstituted in a bowl by the addition of hot water to produce a breakfast cereal type of product that was quite appetizing in appearance, odor and taste, and was quite creamy and smooth in taste.

EXAMPLE 2

Example 1 was repeated, except that the starting dry admixture contained 3.0 parts by weight of sodium chloride about 97 parts by weight of wheat farina and minor amounts of flavoring agents. Also, reconstitution was done using warm milk.

EXAMPLE 3

Example 1 was repeated, except that the dry wheat middlings was replaced with an equal weight of dry rye middlings.

EXAMPLE 4

Example 1 was repeated, except that the dry wheat middlings was replaced with an equal weight of dry barley middlings.

EXAMPLE 5

This example followed the procedure illustrated in the FIGURE and is a preferred embodiment of the invention.

Unprocessed (raw) wheat middlings were removed from bulk storage and cleaned. 1700 lbs. of cleaned, raw, wheat middlings were weighed into a batch scale tank. The wheat middlings were conveyed to a ribbon mixer where 30 gal. of water was sprayed on the middlings. The batch was mixed until the middlings were wetted (for approximately 10 minutes) to achieve a moisture content of 22 weight percent. The water added to the wheat middlings was 255 pounds. The wetted wheat middlings were conveyed first using a screw conveyor and then a pneumatic conveyor, to a steam, pressure cooker. The wetted wheat middlings were cooked for 15 minutes at 13 psi. The timing of the cooking was from the moment steam was introduced into the cooker. At the cooking period, the cooker was exhausted. The cooked wheat middlings had a moisture content of 23 to 24 weight percent. The cooked wheat middlings were dumped onto a cooling conveyor, subjected to limiting rotors and conveyed on a cooling conveyor to a first lump breaker (used to reduce the large lumps). The cooked wheat middlings were conveyed on a cooling conveyor to a second lump breaker and then conveyed to two mills. (Further cooling, if necessary, could be done using cooling reels before treatment in the mills.) A number 3 screen (U.S. series) was used in each mill. The conveyor used to convey the cooled wheat material into the mills was a cooling and load-leveling belt conveyor which regulated the flow of material. The milled material was fed into a surge hopper and then conveyed to a feeder for the flaker.

Cold water-cooled flaking rolls were used to flake the cooked material. The material would have stuck to hot flaking rools. The flaked material had a density of 40 to 42 g/cc and a moisture content of 18 to 20 weight percent. The flaked material was then conveyed to a dryer and dried to a moisture content of 12 to 14 weight percent. The dried material was placed in barrels or a storage bin or fed directly into production (that is, blending with fortification).

The fortification mixture had the following composition:

| | |
|---|---|
| Invention Dried, Flaked, Wheat Material | 100.000 |
| Maltrin | 45.4799 |
| Dough Salt | 25.5573 |
| Fully Fortified Wheat Germ Plus Iron | 29.9161 |
| Guar Gum | 18.3597 |
| Alginate | 4.7530 |
| Fine Grain Sugar Plus Antioxidant | 25.44268 |

Sufficient fortification mixture was added to the dried, flaked, wheat material to produce a fortified product (having 20.7 weight percent of the fortification mixture and 79.3 weight percent of the invention dried, flaked, wheat material).

What is claimed is:

1. The dry, non-toasted, instant, wheat farina product in flake form which will readily rehydrate with hot water, prepared by the process comprised of the steps:
   (a) impregnating wheat material, which is wheat particles in a reduced-size state, with a sufficient amount of water to saturate the wheat material;
   (b) tempering water-impregnated material (a) to produce a tempered material at uniform moisture;
   (c) cooking tempered material (b) at a temperature of 110° to 120° C., at a pressure of 5 to 15 p.s.i. and for 10 to 30 minutes, said cooking being sufficient to gel the starch present in the wheat material, the average particle size of material (b) being increased thereby;
   (d) reducing the average particle size of cooked material (c), cooked material (c) being in particulate form;
   (e) flaking cooked, particulate material (d) at a temperature of 120° F. or less to form a material in flake form; and
   (f) drying flaked material (e) at a temperature of 65° to 85° C. for 5 minutes to 0.25 hour to provide a dry product in flake form, said dry flaked material (f) being non-toasted, the dry, flaked product being capable of being readily rehydrated to have the texture and flavor characteristics of cooked wheat farina.

2. Dry, non-toasted, instant, cereal grain farina product in flake form which will readily rehydrate with hot water, prepared by the process comprised of the steps:
   (a) impregnating cereal grain material, which is cereal grain particles in reduced-size state, with a sufficient amount of water to saturate the cereal grain farina material;
   (b) tempering water-impregnated material (a) to produce a tempered material at uniform moisture;
   (c) cooking tempered material (b) at a temperature of 110° to 120° C., at a pressure of 5 to 15 p.s.i. and for 10 to 30 minutes, said cooking being sufficient to gel the starch present in the cereal grain material, and the average particle size of material (b) being increased thereby;

(d) reducing the average particle size of cooked material (c), cooked material (c) being in particulate form;

(e) flaking cooked, particulate material (d) to form a material in flake form, said flaked material (f) being non-expanded; and (f) drying flaked material (e) at a temperature of 65° to 85° C. for 5 minutes to 0.25 hour to produce a dry product in flake form, said dry flaked material (f) being non-toasted, the dry, flake product being capable of being readily rehydrated to have the texture and flavor characteristics of cooked cereal grain farina.

3. The dry, instant, cereal grain farina product as claimed in claim 2 wherein the cereal grain is rice, barley, oats, rye, corn or millet.

* * * * *